United States Patent
Arora et al.

(10) Patent No.: US 7,053,341 B2
(45) Date of Patent: May 30, 2006

(54) METHOD AND APPARATUS FOR DRUM LEVEL CONTROL FOR DRUM-TYPE BOILERS

(75) Inventors: Manu Dev Arora, Schenectady, NY (US); Leroy Omar Tomlinson, San Diego, CA (US); Raub Warfield Smith, Ballston Lake, NY (US); Bruce Gordon Norman, Ballston Lake, NY (US); Matthew Lennon, Swansea (GB)

(73) Assignee: General Electric Company, Schenectady, NY (US)

(*) Notice: Subject to any disclaimer, the term of this patent is extended or adjusted under 35 U.S.C. 154(b) by 176 days.

(21) Appl. No.: 10/777,580

(22) Filed: Feb. 12, 2004

(65) Prior Publication Data

US 2005/0178759 A1    Aug. 18, 2005

(51) Int. Cl.
*H06B 1/02* (2006.01)

(52) U.S. Cl. ............. 219/490; 219/496; 219/497; 392/324; 122/448.1; 60/775; 60/39.3

(58) Field of Classification Search ......... 219/497, 219/490, 501, 506, 496; 432/219; 392/324, 392/400, 441; 122/448.1, 451.1; 60/39.3, 60/39.53, 39.18 B, 775
See application file for complete search history.

(56) References Cited

U.S. PATENT DOCUMENTS

| | | | |
|---|---|---|---|
| 3,953,966 A | 5/1976 | Martz et al. | |
| 4,027,145 A | 5/1977 | McDonald et al. | |
| 4,036,011 A | 7/1977 | Gupta | |
| 4,081,956 A | 4/1978 | Baker et al. | |
| 4,099,374 A | 7/1978 | Foster-Pegg | |
| 4,242,989 A | 1/1981 | Chamberlain | |
| 4,437,313 A | 3/1984 | Taber et al. | |
| 4,440,114 A | 4/1984 | Tuttle | |
| 4,455,614 A | 6/1984 | Martz et al. | |
| 4,613,952 A * | 9/1986 | McClanahan | 703/6 |
| 4,802,446 A | 2/1989 | Triggs | |
| 4,941,113 A | 7/1990 | Dundics et al. | |
| 5,148,775 A | 9/1992 | Peet | |
| 5,412,936 A | 5/1995 | Lee et al. | |
| 5,412,937 A | 5/1995 | Tomlinson et al. | |
| 5,428,950 A | 7/1995 | Tomlinson et al. | |
| 6,634,165 B1 | 10/2003 | Tomlinson et al. | |
| 2002/0083712 A1 | 7/2002 | Tomlinson et al. | |
| 2005/0045117 A1 * | 3/2005 | Rowe et al. | 122/448.1 |

* cited by examiner

*Primary Examiner*—Mark Paschall
(74) *Attorney, Agent, or Firm*—Armstrong Teasdale LLP

(57) ABSTRACT

A method for controlling the level of a drum in a drum-type boiler includes adjusting a gain of a drum level PID (such as a Proportional Integral Derivative control) in accordance with a signal representative of a set of tuning constants, a signal representative of drum level, and a signal representative of a drum level setpoint. The method also includes utilizing a flow control PID to adjust a drum level control valve, wherein the flow control PID adjusts the drum level control valve in accordance with an output of the drum level PID, a signal representative of steam flow, and a signal representative of drum feedwater flow.

16 Claims, 5 Drawing Sheets

METHOD AND APPARATUS FOR DRUM LEVEL CONTROL FOR DRUM-TYPE BOILERS

BACKGROUND OF THE INVENTION

This invention relates generally to methods and apparatus for enhancing performance of drum type boilers while reducing operational disruptions.

Disruptions in service of drum type boilers can lead to loss of revenue as a result of reduced power generation from a power plant. Further, disruptions in service can lead to reduced life of power plant components.

Drum level trips are the most common cause of trips and disruptions in a power station, especially from the Heat Recovery Steam Generator/Balance of (power) Plant (HRSG/BOP) area. A trip of a plant stresses and reduces the life of power plant equipment and machinery.

Drum type boilers are the most commonly used boilers in power generation plants. There are two trips from a boiler drum level. The extremely high level trip is related to the safety of the steam turbine from the possibility of a water carry over. In the event of an extremely high level trip, the steam turbine is tripped offline if it is a multi-shaft configuration of combined cycle. If the steam turbine is a single-shaft configuration, the unit as a whole is tripped. A low level trip can also occur to protect the boiler from damage from high temperature from the heat source without water covering heat sensitive parts of the boiler. For a low level trip, the heat source (e.g., the gas turbine in a combined cycle power plant) is tripped.

Oscillations in feedwater flow result in variation in the steam production from a drum. In multi-drum or pressure boilers, systems are linked together so that disturbances and oscillations in one drum may cause disturbances in other drums. In the case of drums with a feedwater control upstream of an economizer, water steams in the economizer when flow is reduced. This steaming causes fouling of the interior of the tubes in the economizer. For drums in which the feedwater control valve is between the economizer and the drum, the economizer does not steam at low water flow, but the water in the economizer can be heated above the saturation temperature so that the water flashes in the feedwater control valve which erodes its seat.

In at least one known control system for drum type boilers, at low steam flows, control is initiated as a single element control mode, i.e., only the levels needed to control the Feedwater flow into the drum and to control the level are monitored. This control can be sluggish as the level change lags behind changes in steam flow. However, at low steam flows, the single element control mode is appropriate as flow conversions at the low end of the range are less accurate due to square root extraction from differential pressure transmitters used for measuring flows. Thus, small changes in the steam flows do not affect the drum level controls to a great extent at this range of the flow.

When the steam flow reaches a higher level (e.g., to the order of 20–30%) of the range of the flows, the control mode is switched to three-element control. In this control mode, the feedwater flow is controlled by controllers that monitor three signals, namely, drum level, feedwater flow, steam flow. Two controllers are used. A main controller controls flow, in that the main controller attempts to closely match the feedwater flow into the drum to the steam flow. The change or deviation in the drum level from the normal operating level provides a trim function to this control. This arrangement is called a cascaded control loop.

The tuning of the cascaded control loop in at least one known configuration is performed by making the feedwater PID (Proportional Integral Derivative) controller very fast with a high integral component. The level PID has mostly proportional content. Adding a high integral component to such a configuration can lead to a control that is highly responsive to flow variations. In addition, when the level deviation error remains high, the integral component increases with time to correct or trim the feedwater flow to correct the drum level. Increasing the integral component provides satisfactory level control for both a steady state condition in which there is low deviation from the normal water level and for a process upset condition with high deviation. However, the feedwater control tends to be oscillatory and can take a long time to settle down.

BRIEF DESCRIPTION OF THE INVENTION

Some aspects of the present invention therefore provide a method for controlling the level of a drum in a drum-type boiler. The method includes adjusting a gain of a drum level PID (such as a Proportional Integral Derivative controller) in accordance with a signal representative of a set of tuning constants, a signal representative of drum level, and a signal representative of a drum level setpoint. The method also includes utilizing a flow control PID to adjust a drum level control valve, wherein the flow control PID adjusts the drum level control valve in accordance with an output of the drum level PID, a signal representative of steam flow, and a signal representative of drum feedwater flow.

In other aspects, the present invention provides a control apparatus for controlling the level of a drum in a drum-type boiler. The apparatus is configured to adjust a gain of a drum level PID in accordance with a signal representative of a set of tuning constants, a signal representative of drum level, and a signal representative of a drum level setpoint. The apparatus is further configured to utilize a flow control PID to adjust a drum level control valve, wherein the flow control PID adjusts the drum level control valve in accordance with an output of the drum level PID, a signal representative of steam flow, and a signal representative of drum feedwater flow.

It will be appreciated that configurations of the present invention provide increased performance by allowing heat utilization systems of a power plant to provide higher efficiency. By providing intelligent drum level control, some configurations of the present invention provide a combination of smooth control during normal steady state operation as well as highly responsive control during condition of a process upset. Moreover, some configurations of the present invention also reduce the effects of erosion on feedwater control valves by reducing oscillations of the feedwater flow. Furthermore, by stabilizing flows in one drum, stabilization in other drums in a power plant is facilitated.

DETAILED DESCRIPTION OF THE INVENTION

The term "PID" as used herein is not limited to a proportional integral derivative control. Rather, the term "PID" is used herein to refer to a control selected from the group consisting of proportional controls, proportional plus integral controls, proportional plus derivative controls, and proportional integral derivative controls.

Figure 1:
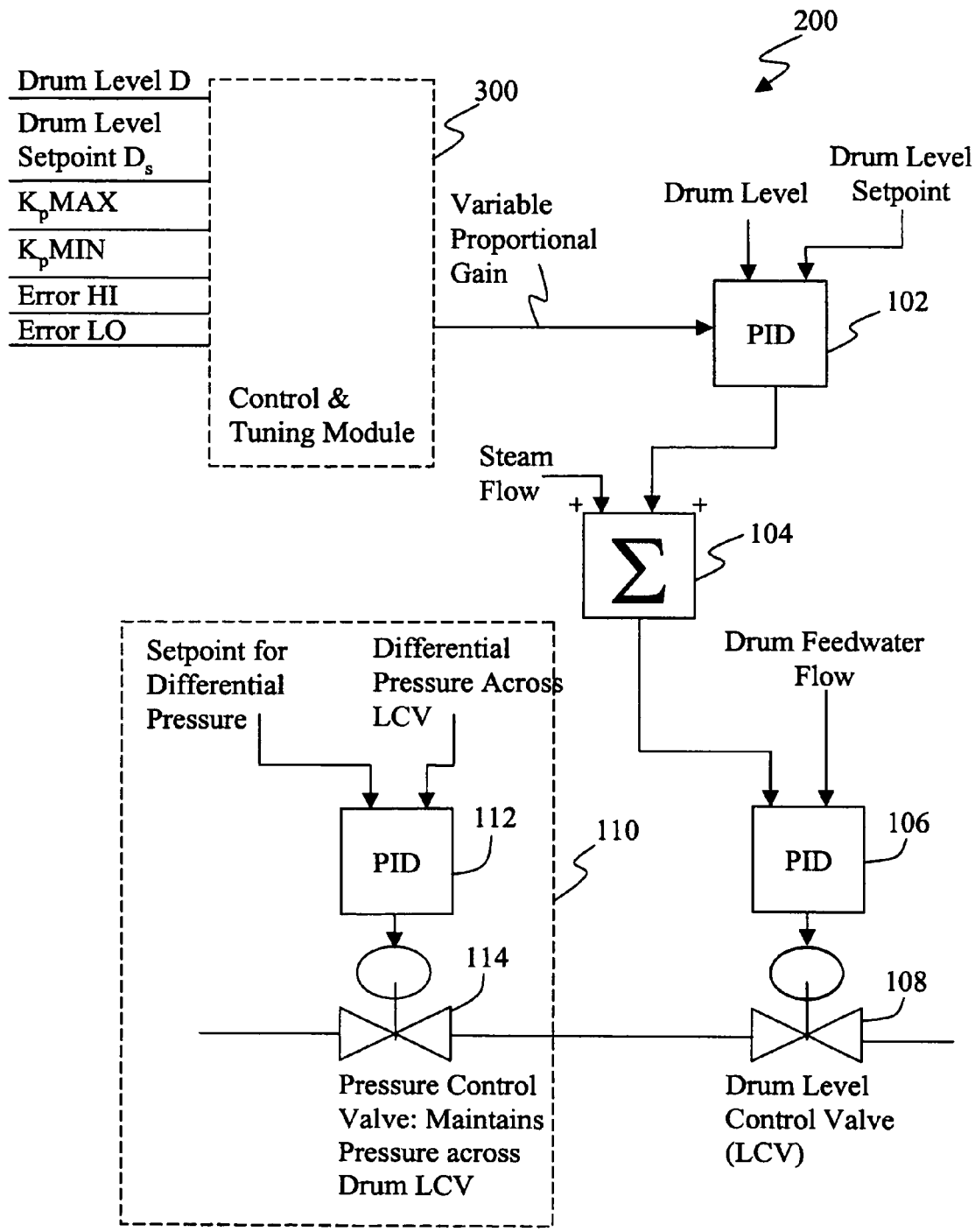
FIG. 1 is a schematic representation of at least one configuration of a control apparatus of the present invention.

In some configurations of the present invention and referring to FIG. 1, a drum-type boiler control 200 is provided with a control and tuning module 300 that provides boiler tuning in both steady state conditions and in process upset conditions.

Figure 2:
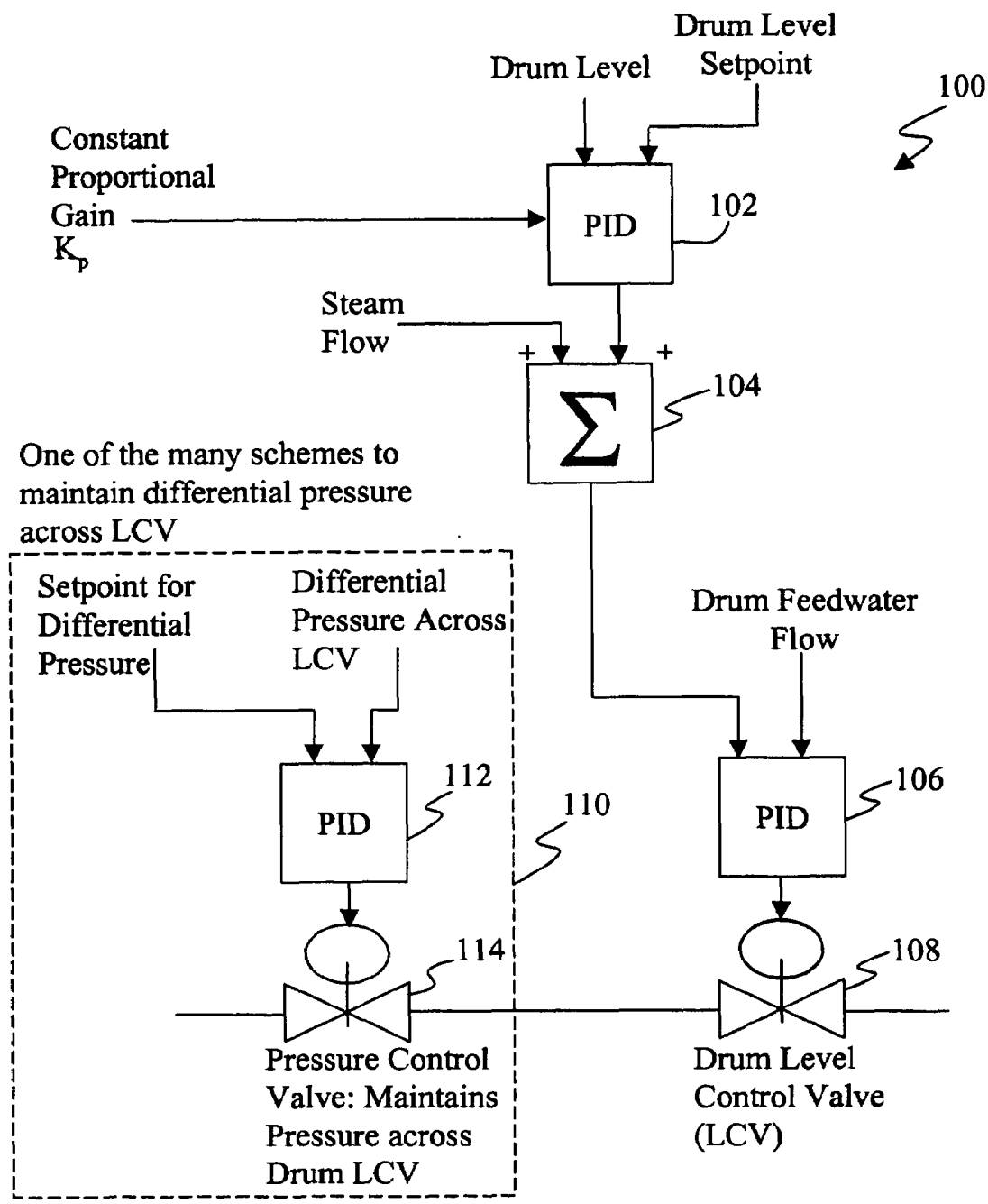
FIG. 2 is a schematic representation of a prior art control apparatus configuration.
Figure 3:
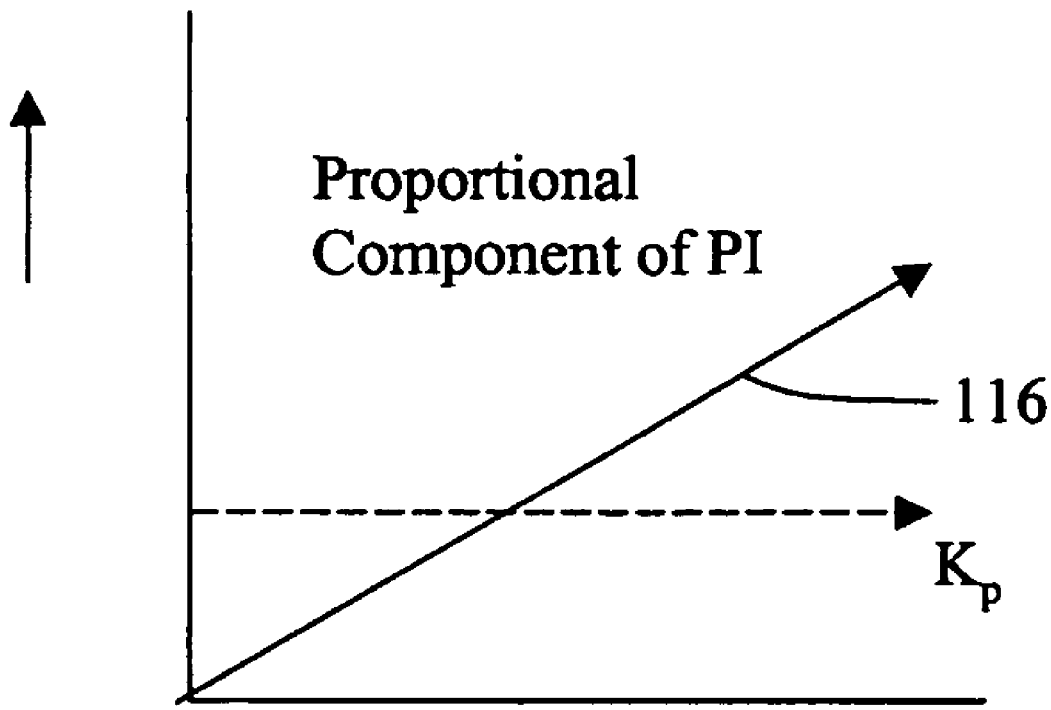
FIG. 3 is a graph showing proportional control of PI relative to absolute error of level from a setpoint in the prior art control apparatus configuration of FIG. 2.

In a prior art three-element control system 100 represented in FIG. 2, drum level, feedwater flow, and steam flow are used as variables. A drum level PID control 102 uses a selected drum level setpoint, a signal representative of drum level, and a constant proportional gain Kp to provide an output that is summed with a signal representative of steam flow at summer 104 to provide a output that is used as a setpoint for feedwater flow. (Inputs such as the signal representative of drum level can be derived from a plurality of redundant sensors to enhance reliability.) The output of summer 104 is provided as an input along with a signal representative of drum feedwater flow to flow control PID 106. The output of flow control PID 106 drives a feedwater/drum level control valve (LCV) 108 position. LCV 108 controls the feedwater flow to a drum, which in turn controls the drum level. To maintain a constant loop gain, differential pressure across LCV 108 is kept constant. One suitable, known configuration of a constant differential pressure maintaining means (CDPMM) 110 is represented in FIG. 2. CDPMM 110 comprises a PID controller 112 having as inputs a selected setpoint for differential pressure and a signal representative of differential pressure across LCV 108. PID controller 112 produces an output that controls a pressure control valve 114 that, in turn, controls differential pressure across LCV 108. FIG. 3 shows the variation of Kp of the proportional gain of PID 102. Note that Kp remains constant, whereas the value of the proportional component of PID controller 102 increases linearly as the error increases. The slope of line 116 (which represents the proportional component) is dependent upon the constant Kp, which controls the responsiveness of three element control system 100.

Figure 4:
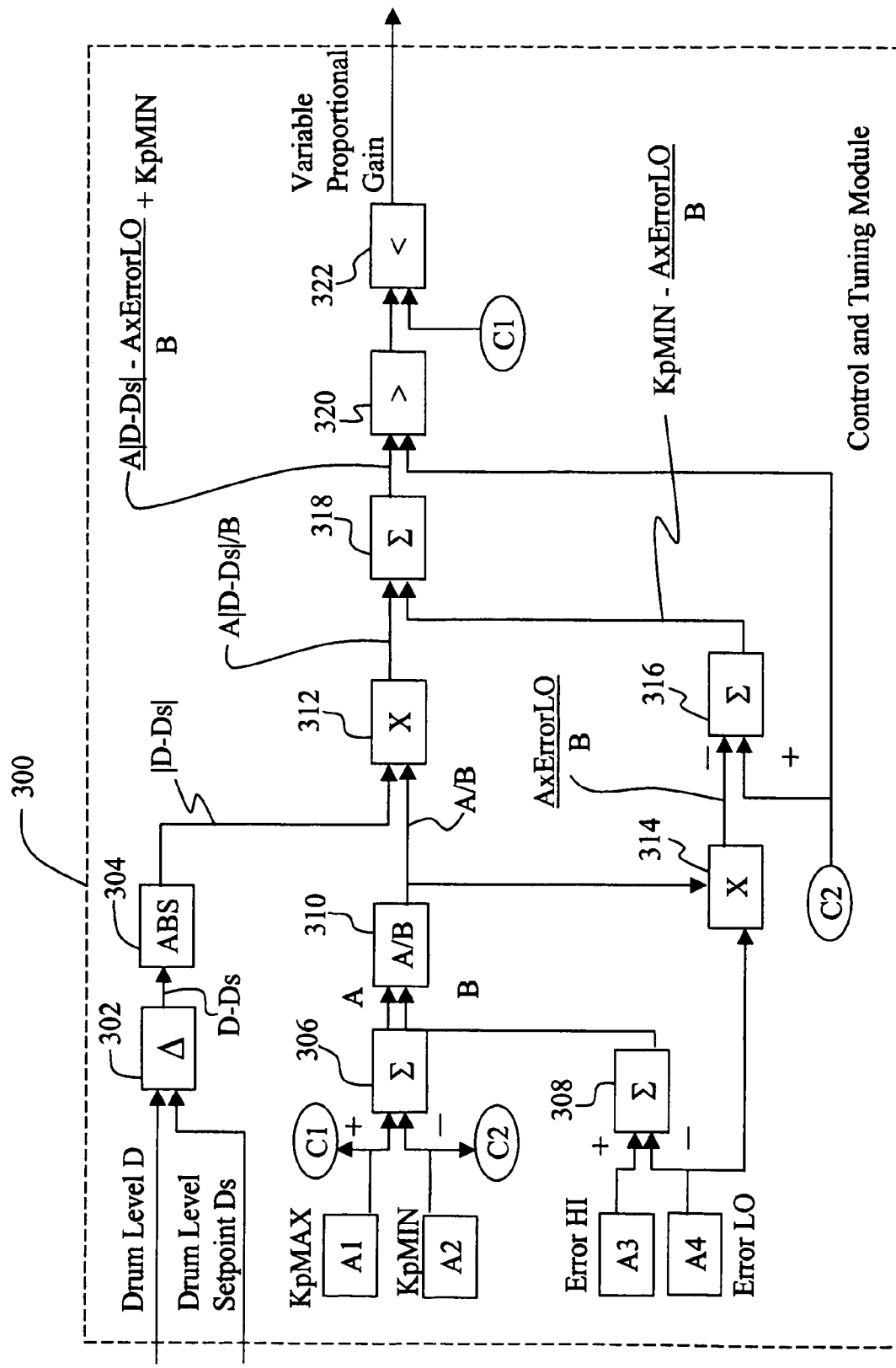
FIG. 4 is a block diagram of a configuration of a control and tuning module suitable for use in various configurations of the present invention.

In some configurations of the present invention and referring to FIGS. 1 and 4, a variable proportional gain is provided to PID 102 utilizing control and tuning module 300. The output of PID 102 is summed with a signal representative of steam flow at summer 104 to provide a feedwater flow setpoint to PID 106 in cascade arrangement. The output of flow control PID 106 controls feedwater/LCV 108. To maintain a constant loop gain, a CDPMM 110 similar to that shown in FIG. 2 (or of any other suitable type) is used to control differential pressure across LCV 108 to provide a constant loop gain even with variation in drum pressure. In some configurations of the present invention, four tuning constants are used to determine a proportional tuning constant to drum level PID 102 which cascades into flow control PID 106. The four tuning constants comprise a minimum proportional gain KpMAX, a maximum proportional gain KpMIN, a minimum error ErrorLO, and a maximum error ErrorHI. The units of KpMAX and KpMIN are per unit, and the units of ErrorLO and ErrorHI are of the same unit as the drum level, e.g., mm or inches.

Figure 5:
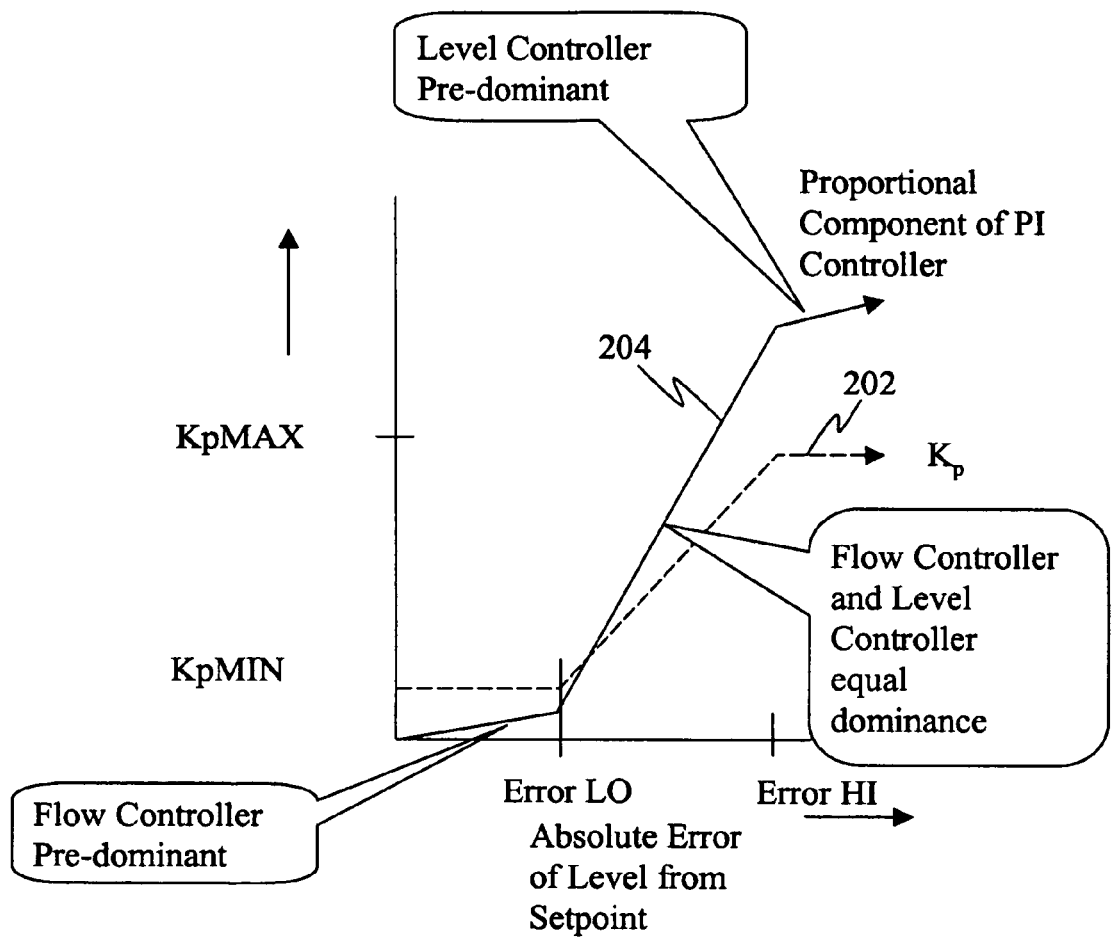
FIG. 5 is a graph illustrating relative predominance of the level control PID and the flow control PID as a function of absolute error of level from a level setpoint, in a configuration of the present invention represented by FIGS. 1 and 4.

Also, in some configurations of the present invention, the variation of Kp of drum level PID 102 is represented by dotted line 202 in FIG. 5. The proportional component of drum level PI Controller 102 as a function of drum level error is represented by solid line 204 in FIG. 5. For low drum level error the proportional gain (represented by dotted line 202) is KpMIN until drum level error is less than ErrorLO. When the drum error increases beyond ErrorLO, the proportional gain increases linearly until it reaches KpMAX at the drum level ErrorHI. Beyond this drum level error, the proportional gain remains at KpMAX.

When the absolute value of the deviation of the drum level is less than ErrorLO, the gain (represented by dotted line 202) of drum level Controller PID 102 is KpMIN. In some configurations, KpMIN is set to a very low number to ensure that the output (represented by solid line 204) of PID 102 has almost no effect except staying at its last value. Flow control PID 106 is the dominant PID in this condition. As the deviation of the drum level from the Normal Operating Level increases beyond ErrorLO, the gain of Level Control PID 102 starts increasing linearly towards KpMAX, which shifts dominance of the control shifting from the flow control to an equal dominancy of the level controller at at least one operating point. As the deviation of the level increases further away from the normal water level, the gain of level control PID 102 increases to KpMAX when the absolute value of the deviation equals ErrorHI. At this condition the gain of level control PID 102 saturates to KpMAX. Any deviation having an absolute value greater than ErrorHI results in drum level PID 102 having a gain of KpMAX.

In some configurations, the KpMAX figure is sufficiently high such that, when the deviation of the drum level from the normal water level is more than ErrorHI, the control mode is essentially that of a level control. When the control mode is that of a level control PID, the flows are not being considered and the controls depend upon any included feedwater flow limiting logic in this case. In many configurations, the control output to valve 108 is limited from opening further if the feedwater flow exceeds the Maximum Continuous Rating (MCR) of the Boiler by 25% (or some other ratio). Thus, addition of feedwater beyond a certain limit has the effect of shrinkage in the drum, resulting in the system to put in water at even a higher rate. This effect continues until water in the drum is quenched and the level starts to rise. The level has the potential of rising to beyond the trip limit and tripping the equipment consuming the steam. A benefit of adding a feedwater flow limiting module 110 downstream of drum level control module 200 is that the quenching and subsequent high level trip does not happen in the event of an upset leading to an initial low drum level. Under normal steady state conditions the feedwater flow tends to be stable and robust in the presence of process and measurement noise.

During low flows, steaming water can foul of the interior of the tubes in the economizer. Configurations of the present invention reduce the fouling of the economizer tubes by reducing oscillations in the feedwater flows.

For drums for which feedwater control valve 108 is between the economizer and the drum, the economizer does not steam at low water flow, but the water in the economizer can be heated above the saturation temperature so that the water flashes in feedwater control valve 108. These flashes can erode the seat of valve 108. Various configurations of the present invention reduce the effect of this erosion by reducing the oscillations of the feedwater flow.

In some configurations of the present invention and referring to FIG. 4, a drum level signal D and a selected drum level setpoint Ds are input to a subtractor 302, which produces a difference signal D−Ds. This difference signal is input to an absolute value module 304 to produce the absolute value of the difference signal |D−Ds|. In the meantime, a selected value KpMAX and the negative of a selected value KpMIN are input to summer 306 to develop a signal A=KpMAX−KpMIN. Also, a selected value ErrorHI and the negative of ErrorLO are input to summer 308 to develop a signal B=ErrorHI−ErrorLO. The signal A/B is developed by divider 310, where A/B=(KpMAX−KpMin)/(ErrorHI-ErrorLO). The A/B signal and the drum level absolute difference signal |D−Ds| are input to multiplier 312 to produce a signal A|D−Ds|/B. Meanwhile, the signal A/B is multiplied by ErrorLO by multiplier 314 to produce signal (A×ErrorLo)/B, which is subtracted from KpMIN by adder 316 to produce a signal KpMIN−(A×ErrorLo)/B. The latter signal is added to the signal A|D−Ds|/B by adder 318 to produce a signal A|D−Ds|/B+KpMIN−(A×ErrorLo)/B. Block 320 selects as its output the greater of this signal or KpMIN. Block 322 selects the lesser of the signal output by block 320 or KpMAX. Thus, the variable proportional gain output by proportional gain determination block 300 is dependent upon drum level D, drum level setpoint Ds, KpMIN, KpMAX, ErrorLO and ErrorHI, but is constrained to be no less than KpMIN and no more than KpMAX. When not constrained, the value output is A|D−Ds|/B+KpMIN−(A×ErrorLo)/B, which can also be written as:

$$Kp\text{MIN}+[(Kp\text{MAX}-Kp\text{MIN})(|D-Ds|-\text{ErrorLO})]/\text{ErrorHI}-\text{ErrorLO}$$

Although the configuration of control and tuning module 300 represented in FIG. 4 is suitable for use as the control and tuning module 300 represented in FIG. 1, the configuration shown in FIG. 4 is given only by way of example. Moreover, the function provided by a suitable control and tuning module 300 need not be identical to that shown in FIG. 5, and indeed need not even be linear. More generally, the output Kp (variable proportional gain) of control and tuning module 300 is a function which is written as:

$$Kp=f(D, Ds, Kp\text{MIN}, Kp\text{MAX}, \text{ErrorHI}, \text{ErrorLO}).$$

Because of the nature of the process being controlled, the processing demands of proportional gain determination block 300 are not great. For example, it is adequate for proportional gain determining block 300 to update its output at intervals up to 0.5 s, and in some configurations even longer update intervals can be tolerated. (It goes without saying that shorter intervals can be used.) As a result, proportional gain determining block 300 can be implemented using a single off-the-shelf digital microprocessor or microcontroller along with a sufficient amount of suitable memory (if sufficient memory is not already included with the processor or microcontroller). In some configurations, the additional functionality is implemented as a modification or reprogramming of an existing digital or integrated control system, incorporated into an existing system as an upgrade, or offered in a new system with the improved functionality. Analog implementations are also possible, in which case updates can occur continuously.

It will thus be appreciated that the use of variable proportional gain in various configurations of the present invention can result in increased stability. Oscillations in feedwater flow cause variation in steam production from a drum. On multi-drum or pressure boilers, disturbances and oscillations in one of the drums can result in disturbance in the other drums. Because stabilizing one drum also tends to stabilize other drums, various configurations of the present invention produce increased stability of multi-drum or pressure boilers.

While the invention has been described in terms of various specific embodiments, those skilled in the art will recognize that the invention can be practiced with modification within the spirit and scope of the claims.

What is claimed is:

1. A method for controlling drum level in a drum-type boiler comprising:
   adjusting a gain of a drum level PID in accordance with a signal representative of a set of tuning constants, a signal representative of drum level, and a signal representative of a drum level setpoint;
   utilizing a flow control PID to adjust a drum level control valve, wherein said flow control PID adjusts the drum level control valve in accordance with an output of the drum level PID, a signal representative of steam flow, and a signal representative of drum feedwater flow; and
   maintaining a constant differential pressure across the drum level control valve.

2. A method in accordance with claim 1 further comprising updating the gain of the drum level control PID at least every 0.5 s.

3. A method for controlling drum level in a drum-type boiler comprising:
   adjusting a gain of a drum level PID in accordance with a signal representative of a set of tuning constants, a signal representative of drum level, and a signal representative of a drum level setpoint; and
   utilizing a flow control PID to adjust a drum level control valve, wherein said flow control PID adjusts the drum level control valve in accordance with an output of the drum level PID, a signal representative of steam flow, and a signal representative of drum feedwater flow;
   wherein said tuning constants comprise a minimum proportional gain KpMIN, a maximum proportional gain KpMAX, a minimum drum level error ErrorLO, and a maximum drum level error ErrorHI.

4. A method in accordance with claim 3 further comprising adding a signal representative of steam flow to an output of the drum level control PID to produce a summed signal and using the summed signal as a setpoint for the flow control PID.

5. A method in accordance with claim 4 further comprising maintaining a constant differential pressure across the drum level control valve.

6. A method in accordance with claim 3 further comprising adjusting the gain of the drum level PID so that:
   when an absolute error of the level of the drum from a setpoint is less than ErrorLO, the flow control PID is predominant over the drum level PID;
   when an absolute error of the level of the drum from the setpoint is greater than ErrorHI, the drum level PID is predominant over the flow control PID; and
   at an operating point when the absolute error of the level of the drum from the setpoint is between ErrorLO and ErrorHI, the flow control PID and the drum level PID are of equal dominance.

7. A method in accordance with claim 6 further comprising updating the gain of the drum level control PID at least every 0.5 s.

8. A method in accordance with claim 7 further comprising maintaining a constant differential pressure across the drum level control valve.

9. A control apparatus for controlling drum level in a drum-type boiler, said apparatus configured to:
adjust a gain of a drum level PID in accordance with a signal representative of a set of tuning constants, a signal representative of drum level, and a signal representative of a drum level setpoint;
utilize a flow control PID to adjust a drum level control valve, wherein said flow control PID adjusts the drum level control valve in accordance with an output of the drum level PID, a signal representative of steam flow, and a signal representative of drum feedwater flow; and
maintain a constant differential pressure across the drum level control valve.

10. An apparatus in accordance with claim 9 further configured to update the gain of the drum level control PID at least every 0.5 s.

11. A control apparatus for controlling drum level in a drum-type boiler, said apparatus configured to:
adjust a gain of a drum level PID in accordance with a signal representative of a set of tuning constants, a signal representative of drum level, and a signal representative of a drum level setpoint; and
utilize a flow control PID to adjust a drum level control valve, wherein said flow control PID adjusts the drum level control valve in accordance with an output of the drum level PID, a signal representative of steam flow, and a signal representative of drum feedwater flow;
wherein said tuning constants comprise a minimum proportional gain KpMIN, a maximum proportional gain KpMAX, a minimum drum level error ErrorLO, and a maximum drum level error ErrorHI.

12. An apparatus in accordance with claim 11 further configured to add a signal representative of steam flow to an output of the drum level control PID to produce a summed signal and to use the summed signal as a setpoint for the flow control PID.

13. An apparatus in accordance with claim 12 further configured to maintain a constant differential pressure across the drum level control valve.

14. An apparatus in accordance with claim 13 further configured to adjust the gain of the drum level PID so that:
when an absolute error of the level of the drum from a setpoint is less than ErrorLO, the flow control PID is predominant over the drum level PID;
when an absolute error of the level of the drum from the setpoint is greater than ErrorHI, the drum level PID is predominant over the flow control PID; and
at an operating point when the absolute error of the level of the drum from the setpoint is between ErrorLO and ErrorHI, the flow control PID and the drum level PID are of equal dominance.

15. An apparatus in accordance with claim 14 further configured to update the gain of the drum level control PID at least every 0.5 s.

16. An apparatus in accordance with claim 15 further configured to maintain a constant differential pressure across the drum level control valve.

* * * * *